US005437010A

United States Patent [19]

Blackman et al.

[11] Patent Number: 5,437,010

[45] Date of Patent: Jul. 25, 1995

[54] EMBEDDED USER INTERFACE ACCESSIBLE BY AN EXTERNAL DEVICE

[75] Inventors: Fran E. Blackman, Fairfield; Jacqueline Collins, Bridgeport; Terrence M. Doeberl, West Redding; Patrick J. Donahue, Stratford; Tracy S. Wilson, Bridgeport, all of Conn.

[73] Assignee: Pitney Bowes Inc., Stamford, Conn.

[21] Appl. No.: 110,234

[22] Filed: Aug. 23, 1993

Related U.S. Application Data

[63] Continuation of Ser. No. 629,792, Dec. 19, 1990, abandoned.

[51] Int. Cl.[6] .............................................. G06F 13/10

[52] U.S. Cl. .................................... 395/161; 395/156; 364/474.22; 364/474.27

[58] Field of Search ............... 395/155, 156, 160, 161, 395/800; 364/188, 474.22, 474.27

[56] References Cited

U.S. PATENT DOCUMENTS

| | | | |
|---|---|---|---|
| 4,425,627 | 1/1984 | Eibner | 395/156 |
| 4,484,304 | 11/1984 | Anderson et al. | 395/161 |
| 4,763,356 | 8/1988 | Day, Jr. et al. | 395/161 |
| 4,803,463 | 2/1989 | Sado . | |
| 4,853,888 | 8/1989 | Lata et al. | 340/712 |
| 4,885,575 | 12/1989 | Williams . | |
| 4,926,343 | 5/1990 | Thor | 395/155 |
| 4,937,762 | 6/1990 | Todome | 395/139 |
| 5,025,383 | 6/1991 | Haines et al. | 395/275 |
| 5,045,880 | 9/1991 | Evanitsky et al. | 395/155 |
| 5,070,467 | 12/1991 | Todome | 395/155 |
| 5,079,723 | 1/1992 | Hercey et al. | 395/155 |
| 5,179,657 | 1/1993 | Dykstal et al. | 395/155 |
| 5,191,643 | 3/1993 | Alsenz | 395/155 |
| 5,309,556 | 5/1994 | Sismilich | 395/161 |

FOREIGN PATENT DOCUMENTS

| | | |
|---|---|---|
| 2119992 | 11/1983 | United Kingdom . |
| 2132138 | 7/1984 | United Kingdom . |

*Primary Examiner*—Parshotam S. Lall
*Assistant Examiner*—Richard L. Ellis
*Attorney, Agent, or Firm*—Charles G. Parks, Jr.; Melvin J. Scolnick

[57] ABSTRACT

A postage meter mailing machine includes an improved embedded user interface. The user interface is suitable for providing a user interface to the mailing machine and also a direct user interface to an external device in bus communication with the mailing machine. The mailing machine includes a programmable microcontroller for performing hard and soft system functions. The microcontroller includes non-volatile memories for storing data information and executable routine. The microcontroller is also in bus communication with a visual display and a plurality of soft keys. Stored in the non-volatile memory is a plurality of system screens for display on said visual display. Each of the screens has a menu field and a prompt field and contains descriptors for a plurality of screen fields. Also, stored in the non-volatile memory are a plurality of text strings, a plurality of graphic display run routines, a plurality of routines for enabling the soft keys and for identifying subsequent screens as a result of operator activation of one of the soft keys. The user interface is programmed to identify a first screen and a screen select routine to (i) get the screen identified from said screen region of said memory and display on said display, (ii) get the text strings identified by said screen descriptor of said identified screen from said text region and display said text string in respective areas of said menu field of said screen, and enable said respective soft key to said respective menu area, (iii) display dynamic information in the display window of said display window and execute graphic routine, (iv) await activation of a soft key and repeat for next screen till end. The microcontroller having polls the system to determine whether any external devices are interfaced to the mailing machine, if so, the screen is designated for control of said respective external devices are enabled.

1 Claim, 7 Drawing Sheets

EMBEDDED USER INTERFACE ACCESSIBLE BY AN EXTERNAL DEVICE

This application is a continuation of application Ser. No. 07/629,792, filed Dec. 19, 1990 now abandoned.

BACKGROUND OF THE INVENTION

This present invention relates to user interface systems for a microcomputer based system and external devices interfaceable to the machine system, and means for providing opertor control over the external device.

It is known for postage meter mailing machine, and like system, to have the capability for interfacing with external devices. For example, it is known to interface a scale with a mailing machine. Customarily, the interface between the two units is functional only, each unit having it own unique user interface system. Therefor, it is required that an operator be familiar with the interface of both devices in order to configure each device for cooperative operation. As the number of devices which can interface to a mailing machine increases, the operator is required to familiarize themselves with a plurality of different interface systems in order to insure cooperative functionality between the external device or devices and the mailing machine. It is considered advantageous if a single interface system could operatively communicate with each device.

SUMMARY OF THE INVENTION

It is an objective of the present invention to present an embeddable machine interface system which can function as a system user interface for the housing machine, e.g., mailing machine, and for external devices operatively connected or associated with the mailing machine.

The mailing machine includes a user interface system comprised of a display, six soft keys aligned to respective portion of the display and a number of hard keys. The mailing machine, inclusive user interface, is under the control of a microcontroller which includes a host programmable microprocessor in bus communication with a suitable memory devices. One of the memory devices is a program memory. The microcomputer is also coupled to the display I/O driver and I/O drivers for the soft keys and hard keys.

The program memory is mapped into a number of regions, for example, a command file region, a text region, screen region, a dynamic field region, a hard key region and a soft key region. The command file contains all the commands for a fully featured mailing machine, inclusive of all option command structures. The execution code routines for the machine functions may be resident in the memory. Therefor, when the mailing machine is interfaced with a external device, for example, a scale, the command set for scale function does not need to be loaded or written to memory. The microcomputer can be programmed to poll the system during system initialization to determine the machine configuration and, according to poll result, enable the the appropriate display screens. Alternatively, subsequent to the polling, the execution code must be down loaded from an external device, such as, an inserter to the microcomputer.

In the screen region is stored the data structure which represents each display screen. As part of that data structure, the screen data defines which hard keys and soft keys are to be enabled with respect to that screen. Each screen is identical in format such that there is a title area, a soft key text area, a dynamic or window area and a hard key text area. Therefor, an external device may employ the user interface merely by conforming its command language to the interface language.

FIG. *7a* and *7b* is a partial schematic representation of a user interface menu flow diagram.

DETAILED DESCRIPTION OF THE PREFERRED EMBODIMENT

Figure 1:
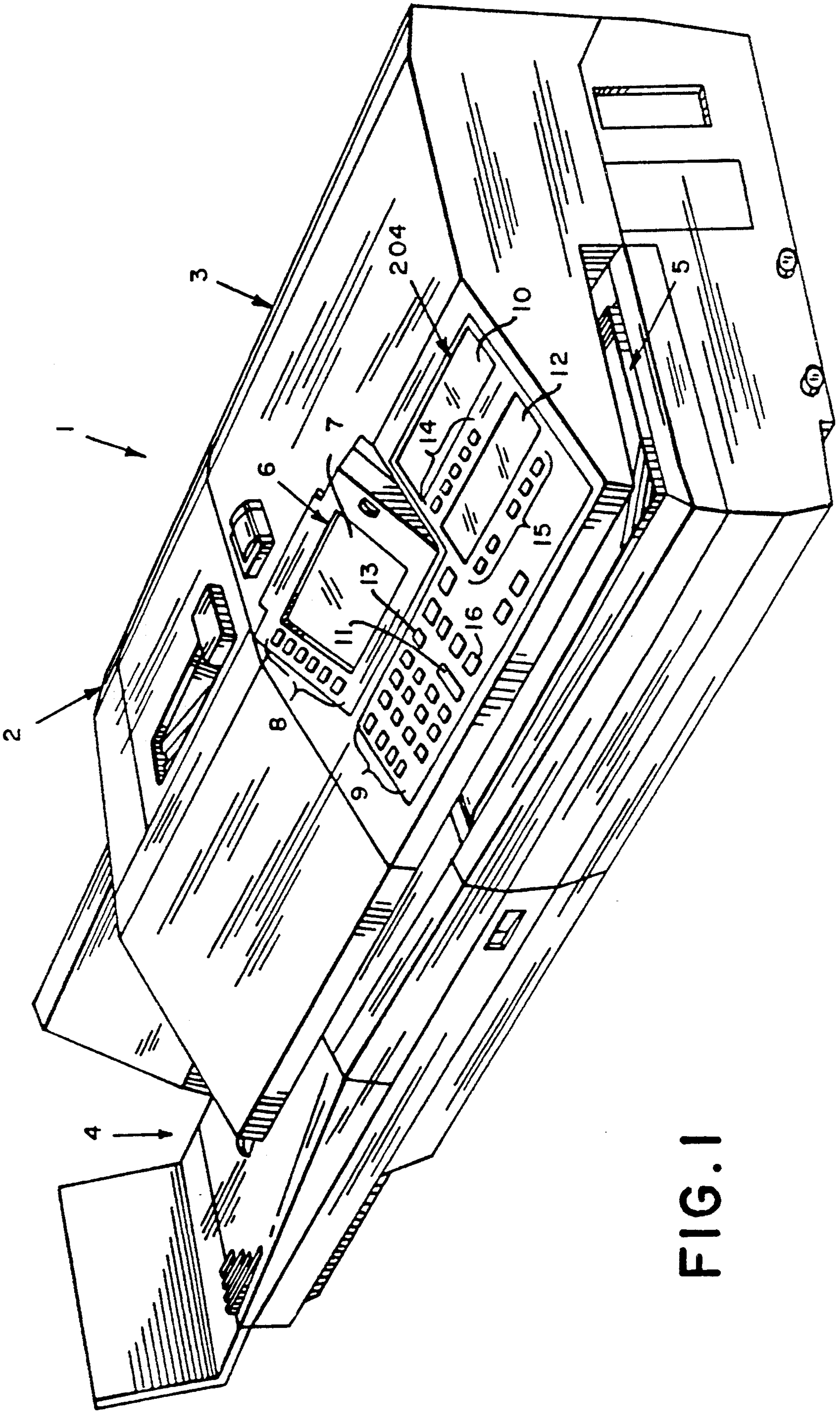
FIG. 1 schematic of a microcomputer system for a mail processing system having a user interface system in accordance with the present invention.

Referring to FIG. 1, the present invention is particularly suited for postage meter mailing machine application. For example, a postage meter mailing machine, generally indicated as 1, is comprised of a feeder section 2 and a postage meter mailing machine section 3. In operation, envelopes are placed in a hopper 4 of the feeder section 2, whereupon the envelopes are serially fed through the feeder section to the mailing machine section 3 for imprinting of a postage indicia on feed envelopes by a postage meter print arrangement (not shown) detachably mounted within the mailing machine section 3. In the preferred embodiment, the mailing machine 1 includes a scale 5 for weighing the envelope and communicating with a microprocessor such that proper postage is printed by the printing mechanism of the postage meter on the envelope according to the weight of the envelope.

The mailing machine 1 includes a user interface, generally indicated as 6. The user interface 6 includes a visual display 7 and a plurality of soft keys 8 aligned to a respective portion of the screen 7 and a plurality of hard keys 9, which form a keyboard or keypad, at least one of the keys 9 are designated as an enter key 11 and another designated as a return key 13. Also one of the hard keys is designated as a start 16. The interface 6 also includes first and second mimic displays 10 and 12, respectively. The mimic interface display also includes function hard keys, generally indicated as 14 which are associated with the mimic display 10 and hard keys 15 which are associated with mimic display 12.

Figure 2:
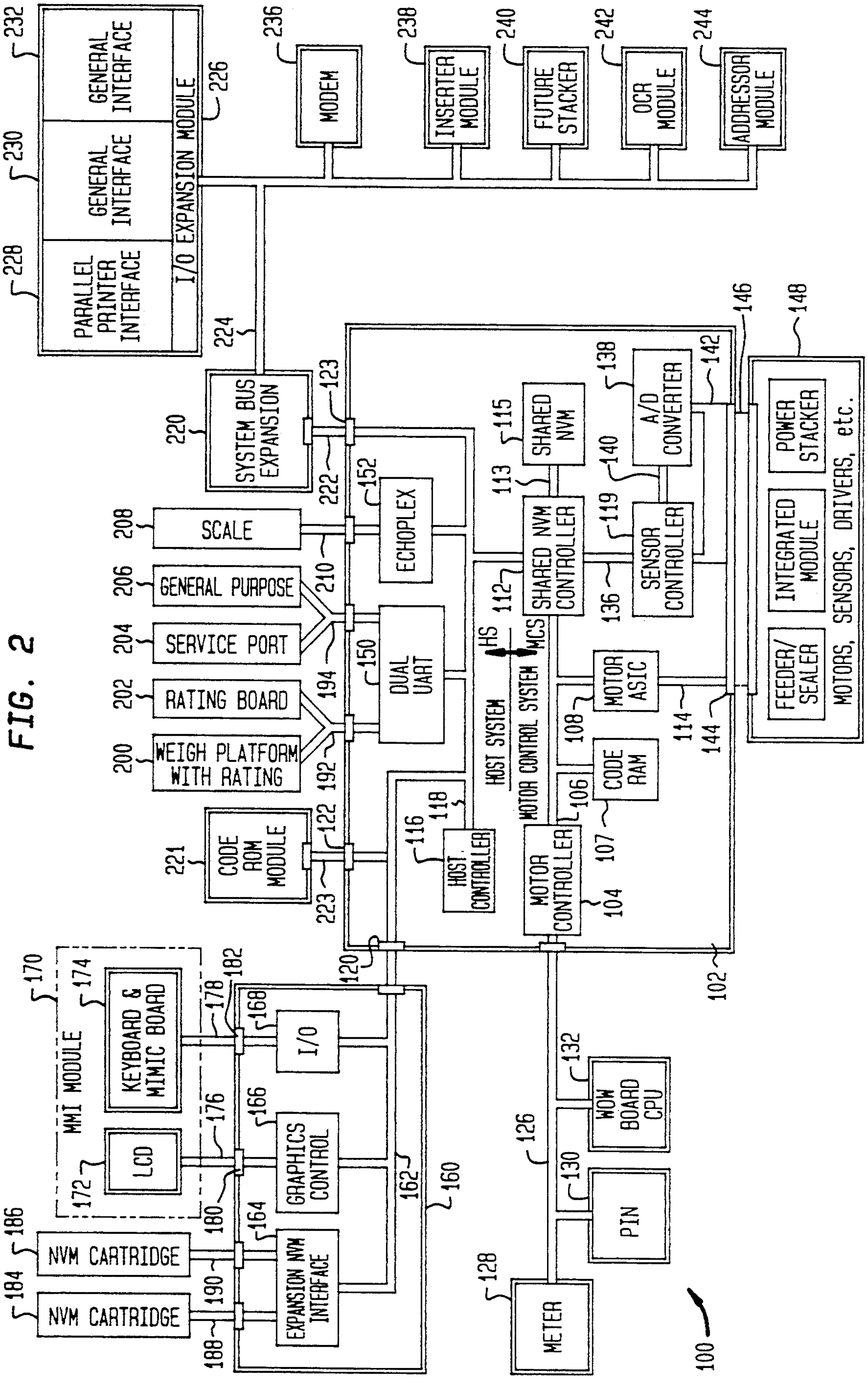
FIG. 2 a schematic of a suitable mailing machine microcontroller system suitable for employing a user interface system in accordance with the present invention.

Referring more particularly to FIG. 2, a suitable microcontroller system, generally indicated as 100, is comprised of a core board 102 having located thereon a microprocessor based motor controller 104 in bus 106 communication with a code read only memory (ROM) 107, a motor application specific integrated circuit (ASIC) 108 and a shared non-volatile memory (NVM)

controller 112. A microprocessor based host controller 116 is in bus 118 with the NVM controller 112 and connectors 120, 122 and 123, respectively. The motor controller 104 is also in bus 126 communication with a meter board 128, dater board 130 and scale board 132, also referred to as Weight On The Weight (WOW) board 132. Also in communication with the host controller bus 118, and thereby the host controller 116, are DUAL UART input-output (I/O) module 150 and a Echoplex communication I/O module 152. The NVM controller 112 is in bus 113 communication with a shared non-volatile memory NVM 115.

A microprocessor based sensor controller 119 is in bus 136 communication with the NVM controller 112. An analog-to-digital (A/D) converter 138 is in bus 140 communication with the sensor controller 119. A sensor bus 142 communicates the sensor controller 119 and A/D converter to the harness coupler 144. A flex harness 146 is attached to the harness coupler 144 at one end and to the respective drive motors and sensors (not shown) of the postage meter mailing machine 1. A more detailed description of a particularly suitable postage meter mailing machine is described in U.S. Pat. No. 4,935,078 entitled HIGH THROUGHPUT MAILING MACHINE TIMING.

A personality module 160 is in communication with the host controller bus 118 through a personality bus 162 through coupler 120. The personality module 160 includes a Expansion NVM 164, a graphics controller 166, a combination keyboard and MIMC I/O port 168. A man machine interface module 170 including a liquid crystal display (LCD) board 172 and a keyboard and MIMIC board 174 which are in respective bus 176 and 178 communication with the graphics controller 166 and I/O board 168 through respective couplers 180 and 182. NVM accounting cartridges 184 and 186 are in communication with the NVM expansion I/O board 164 through coupled bus 188 and 190, respectively.

The dual communication module 150 permits bus 192 and 194 coupling thereto of a weighing platform with integrated rating 200, a rating board 202, a service device 204 or such other general purpose device 206 such as a printer. In like manner, an echoplexed scale 208 may coupled to the echoplex I/O module 152 by bus 210.

A system bus controller 220 is in bus 222 communication with the host controller bus 118 through the coupler 123. Also a code ROM 221 is in coupled bus 223 communication with the host controller bus 118 through coupler 122. The system bus 224 provides communication of the system bus controller 220 with a I/O expansion module 226 from which may be coupled a parallel printer interface 228, a general purpose interface 230 and a custom parallel interface 223. Other optional devices, such as, a modem 236, an inserter module 238, an OCR module 242, an addresser module 224 and an additional stacker module 240 may be carried by bus 224.

Figure 3:
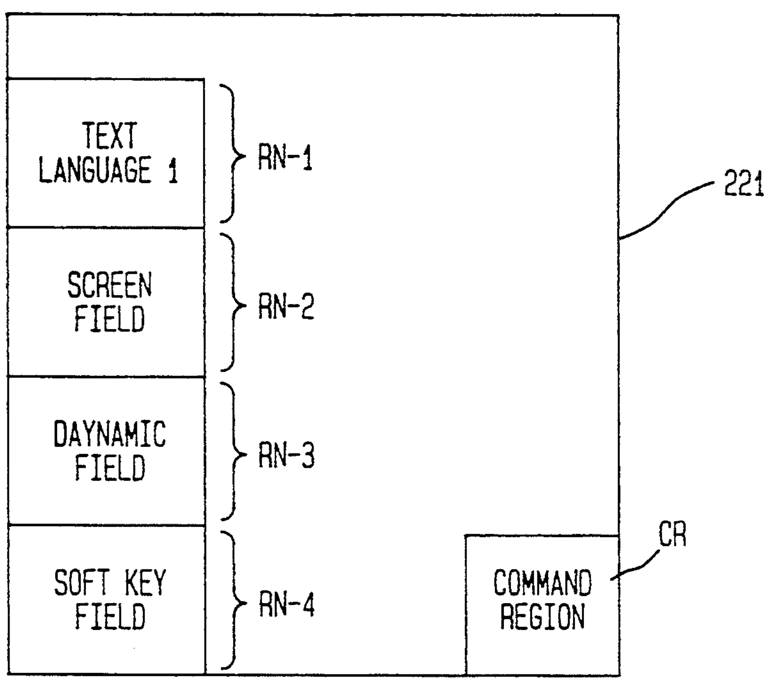
FIG. 3, is a schematic representation of a memory having specified region in accordance with the present invention.
Figure 4:
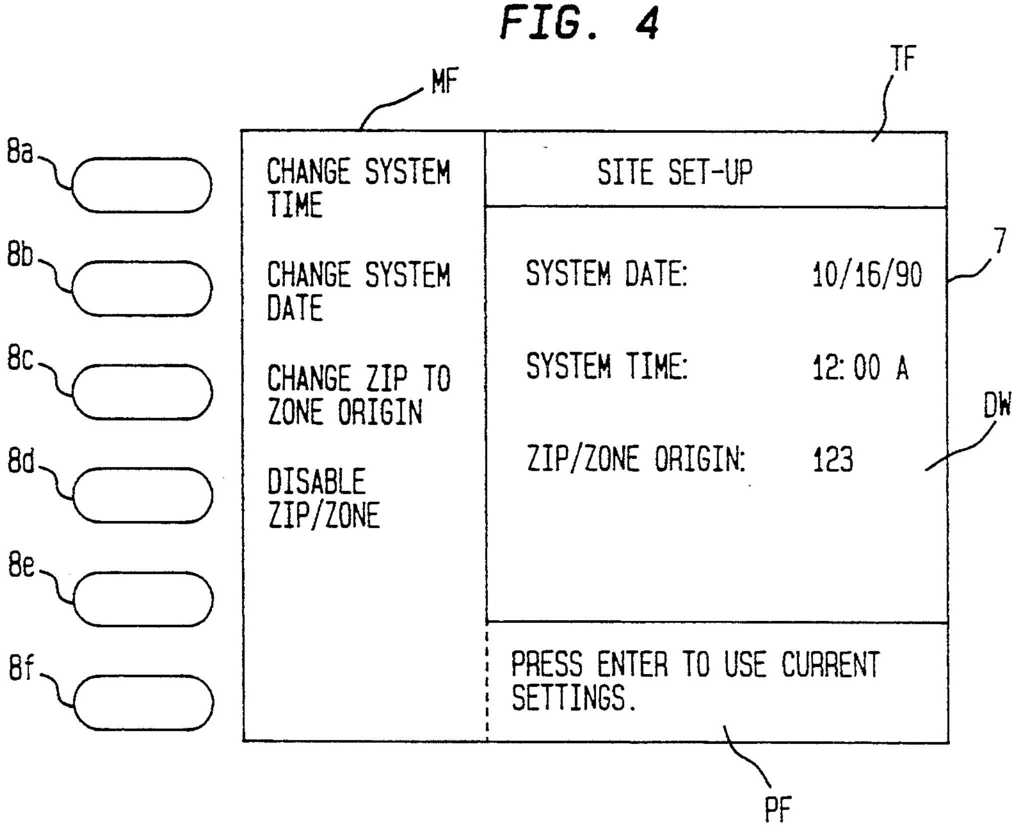
FIG. 4 is a schematic representation of a display having defined regions in accordance with the present invention.

Referring to FIGS. 3 and 4, the display 7 is mapped such that each screen defines data window area DW, a soft key menu field MF, a screen title field TF, a prompt/error field PF. The soft keys, individually referred as 8*a* through 8*f*, are aligned to respective portion of the screen menu field MF. Aligning the soft keys to the screen field MF in this manner allows a machine operator to easily associate the options presented in the menu field MF with the depression of the correspondingly aligned soft key. Operator instructions, request for operator variable data input and operator error messages are presented in the prompt field PF. Within the data window DW, user system information pertinent to the current state of the mailing machine 1 or selected soft function can be presented to the operator. It is noted that the soft function refers to data processing functions, such as, funds accounting, and hard functions refer to machine control functions.

Figure 5:
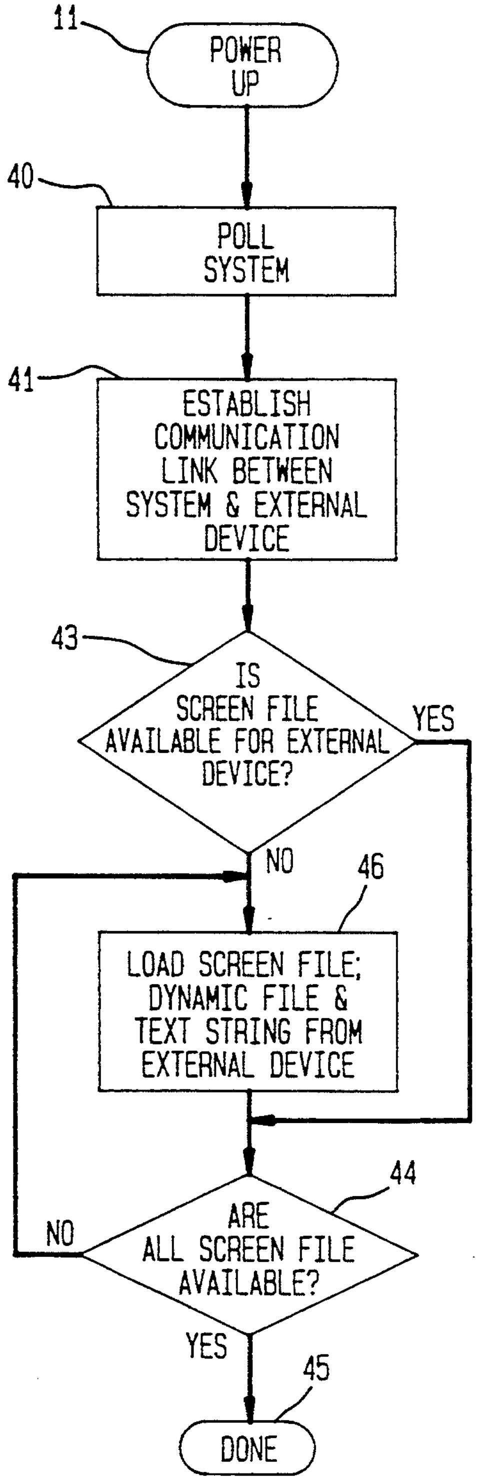
FIG. 5 is a logic schematic of the user interface system load procedure in accordance with the present invention.
Figure 6:
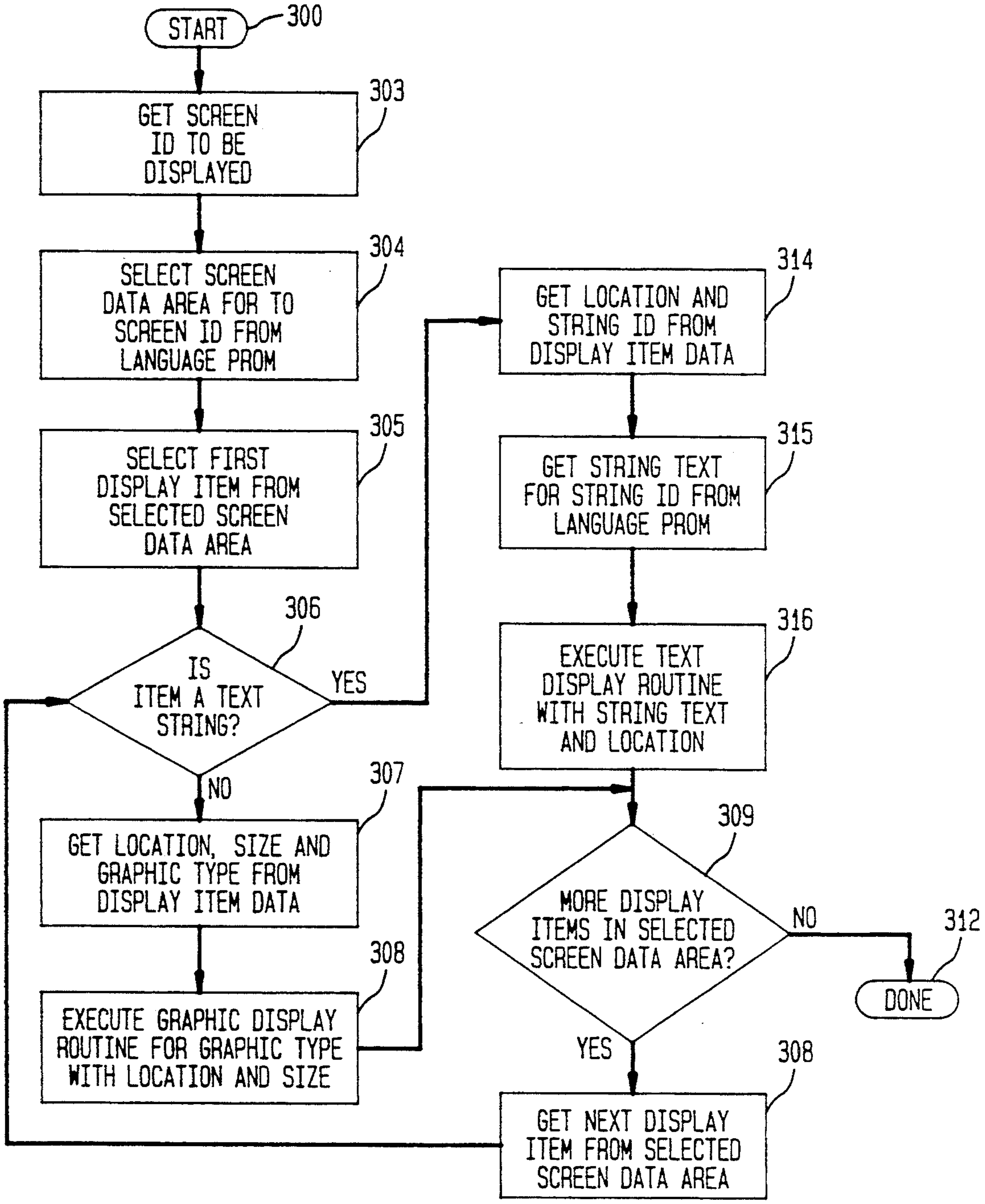
FIG. 6 is a logic schematic for the user interface system screen select in accordance with the present invention.

Referring to FIG. 5, upon power up of the user interface system, the host microprocessor 116 polls the microcontroller system 100 at 40. Following the poll, communication between the host microprocessor 116 and the motor control system MC and external devices (e.g., inserter module 238, OCR module 242, scale 208, etc). The system then checks, at 43, whether the screen file is available for a first external device. If the screen file is available, that is, resident in the screen field RN-2, then the system proceeds to test to see if all remaining screen files are available in the screen field RN-2 at 44. If all the screen files are available for each of the external devices polled, then the system is done at 45.

If at 43, the screen file is not available, the system executes a load at 46 from the external device of its screen files and storages in the screen field RN-2, its dynamic fields and stores in RN-3, the text strings and stores in RN-1, and soft key command and stores in RN-4. After the load is performed, the system checks if all necessary screen files are available at 44. The system loops in this manner until all necessary files have been loaded.

Referring to FIGS. 3 and 5, the Code ROM Module 221 is partitioned into addressable regions. A first one of the regions is the text region RN-1. The text region RN-1 has stored therein the text strings for display. A second region RN-2 has stored the individual screen descriptor for driving the graphics controller 166. Each screen defines the associated text strings to be displayed with that screen. A region RN-3 is reserved for interactive information, that is, the command structure for display of machine state information.

Referring more particularly to FIG. 5, upon initiation of a screen select processor at 300 which is determined by the function key actuated by operator in previous screen, the identified screen is retrieved from the screen field area. Each identified screen within the screen field area includes screen descriptors. Some of which descriptors define the appropriate text strings and define screen location, define the dynamic field for data window, and also enable the appropriated soft keys. At 303, the corresponding data pursuant to the screen descriptor is retrieved. At 305, the first retrieved data item is selected for testing at 306. If the first data item is not a text string, the appropriate graphic information is retrieved from the dynamic field RN-2 at 307. The retrieved graphic display routine is accordingly executed at 308 for display in the data window DW.

Concurrent then with execution of the display routine at 308, a test is performed to determine whether the additional data item has been retrieved at 305. If no further display items have been retrieved, then the routine is finished at 312. If there are additional data items at 309, the routine gets the next data item for testing at 306. If at 306 the data item is a text string, the routine proceeds to 314.

Returning to decision point 306, if a text string has been retrieved as the first item or, as here, is the next data item to be tested, the specific location for display of the data item and the specific corresponding text identification is retrieved at 314. At 315, the specific test string is retrieved and at 316 the text string is caused to be displayed on the display at the proper screen location. Now at 309, the presence of any additional data item is tested for, if no additional data item, the routine proceeds to 312. If there are additional data items, the routine repeats until all data items have been identified and displayed.

Figure 7A:
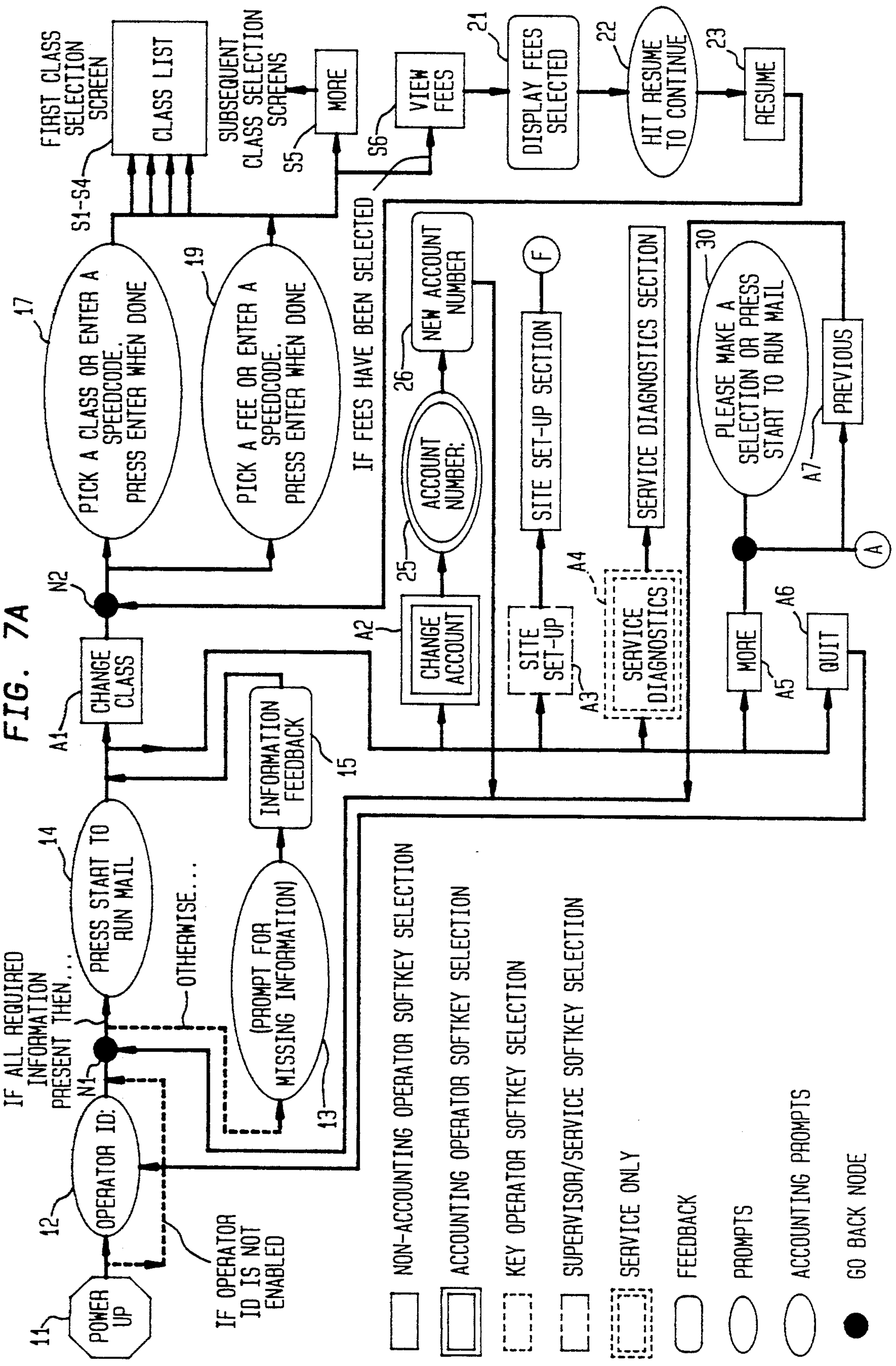
Figure 7B:
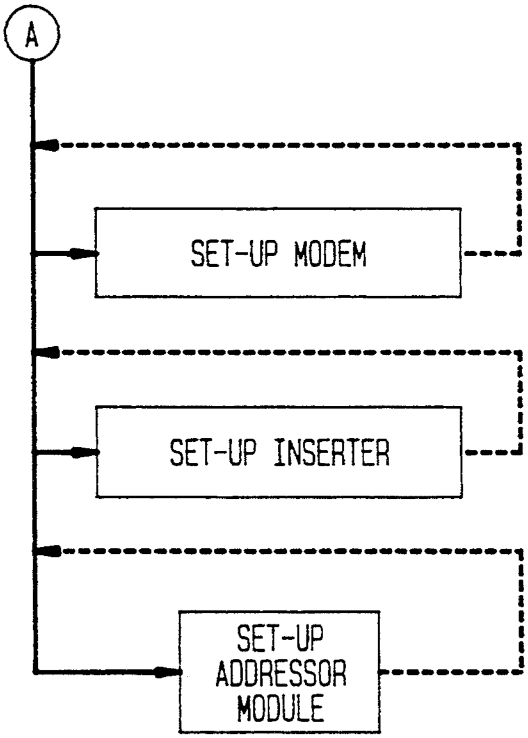

Referring more particularly to FIG. 7, to illustrate a preferred form of the user interface system, upon power-up of the interface system, indicated at 11, the screen retrieve routine is executed. First, within the PF screen field, the operator is prompted to input the operator ID number at 12, if enabled. The interface system proceeds to prompt the user at 14 to press the start key for a mail run at 14. However, prior thereto, the operator will be prompted at 13 to input any missing user ID information at 15. Within the message field MF, the operator is now presented with the menu set A1 through A6 which provides the operator with the option to choose by actuation of the respective soft key to change mail classes, change accounts, prepare site setup, service diagnostic, view addition options or quit.

If the operator should choose to change the mail class by depressing soft key 8a, the operator is then prompted at 17 within the prompt field PF to pick a class or enter a speed code and to press enter when done. The operator is also presented in the menu field with the options S1 through S2 which present a variety of available classes. If the operator were to wish additional classes to choose from, he simply presses the soft key **8*e* aligned to option S5** and additional options are presented to the operator. It should be appreciated that the user interface can proceed in this manner to accommodate as many classes as are desired. As noted and hereafter understood, an operator may choose any of the presented menu choices by depressing the aligned soft key.

Pursuant to a selection of option S6, the operator may choose to view the appropriate fees at 21 in the data window DW associated with the classes displayed in the data window. The operator is then prompted at 22 in the prompt field PF to hit the resume, option S6, to resume the selections at the A1 through A6 menu selection point.

Along with the option to change classes in menu field MF, the operator is given the choice to change accounts at A2 upon which further operation will apply. The operator is presented with a prompt at 25 to enter the account number. Once the new account number is entered at 26, the machine returns to node N1 and the operator is prompted to press the start to run the mail at 14. A diagnostic services option is present at A4 where, should that option be chosen, the user interface will then enter into a service diagnostics display routine which is presented to the user in the similar format as hereafter discussed. Should the operator enter a quit mode A6, the user interface then returns to a request for an operator ID at 12.

The operator may choose at this point to view more options at A5 following which selection the operator is then prompted to make a selection or press start to run at 30 and the operator is presented with a second set of options A7 through A12. The A7 option reinstates option A1 through A6 to the MF. Option A8 allows the operator to display the meter register and other meter information. If selected, the meter information is displayed in the data window DW and the operator is prompted to hit enter or go back to the previous presented options A1 through A6 at 32. The operator may choose to view reports at A9, should the operator make that selection, the operator is then presented with a list of reports in the data window DW and is prompted at 40 to select the report by hard key entry. The operator is then presented with a choice of three report types B1 through B3 to choose from. The available options now being account summary at B1, last transaction at B2, and a site setup and operating reports at B3.

Should the operator choose option A5, the operator will be presented with options B1, B2 and B3, respectively, set-up modem, set-up inserter and set-up addresser module. Selection of any one of the options B1, B2 or B3, allows the user interface of the mailing machine to directly interface with the external devices as desired pursuant to the screen presented options either resident in the user interface or down loaded by the device.

What is claimed is:

1. An improved embedded user interface for an apparatus having a programmable micro controller and bus means for coupling said programmable micro controller of said apparatus to the control unit of an external device, said apparatus having a plurality of hard keys and a plurality of soft keys communicating via a bus with said micro controller of said apparatus and having memory means for storing data and software routines, said micro controller communicating via said bus with a visual display for displaying data and data messages under control of said micro controller, wherein said improved embedded user interface system comprises:

said data stored in said memory means including (a) screen data defining a plurality of respective bit-mapped screens for display on said visual display, said screen having data defining a respective menu field, data defining a data window field and data defining a prompt field, and data defining a descriptor for each of said respective fields for each of said screens, and having said screen data stored in a memory mapped screen region of said memory means, (b) text data defining a plurality of text strings stored in a memory mapped text region of said memory means and each of said text strings being associated with a unique one of said descriptors of said respective menu field, (c) said screen data having data for enabling respective ones of said soft keys corresponding to said descriptors of said respective menu field by said micro controller and data for identifying subsequent one of said screens in response to activation of said respective soft key, and said programmable micro controller of said apparatus being programmed to (a) read said screen data from said screen region of said memory means and display an image representative of said screen data on said visual display, (b) read said text data associated with said descriptors of said respective menu field from said text region of said memory means and display said text data in said respective menu field, and to enable respective ones of said soft keys responsive to said data for enabling respective ones of said soft keys, so that each of said enabled respective ones of said keys performs a corresponding apparatus command, (c) display said data messages in said data defined data window, (d) await activation of one of said soft keys and read said screen data identified by said data for identifying subsequent one of said screens, said micro controller having means for polling said bus to determine whether any external devices are coupled to said bus means of said apparatus and being programmed to cause said control unit of said external device to download other screen data to said memory means of said apparatus.

* * * * *